Patented July 27, 1943

2,325,307

UNITED STATES PATENT OFFICE 2,325,307

DEALKYLATION OF $\alpha,\beta$ - BIS- (p-ALKOXY-PHENYL)-$\alpha,\beta$-DISUBSTITUTED ETHANES AND p,p' DIALKOXY-$\alpha,\beta$ DISUBSTITUTED STILBENES Joseph Corse, Indianapolis, Ind., assignor to Eli Lilly and Company, Indianapolis, Ind., a corporation of Indiana No Drawing. Application December 26, 1941, Serial No. 424,500

6 Claims. (Cl. 260—619)

This invention relates to the dealkylation of $\alpha,\beta$-bis-(p-alkoxyphenyl)-$\alpha,\beta$-disubstituted ethanes and p,p'-dialkoxy-$\alpha,\beta$-disubstituted stilbenes.

Heretofore, in the dealkylation of $\alpha,\beta$-bis-(p-alkoxyphenyl)-$\alpha,\beta$-disubstituted ethanes and p,p'-dialkoxy-$\alpha,\beta$-disubstituted stilbenes, it was necessary to employ expensive Grignard's reagents or to use alcohol solutions under pressure. Both of these methods entailed considerable equipment and involved material expense.

In accordance with the method of dealkylation of this invention, these two types of compounds, $\alpha,\beta$-bis-(p-alkoxyphenyl)-$\alpha,\beta$-disubstituted ethanes and p,p'-dialkoxy-$\alpha,\beta$-disubstituted stilbenes, are converted respectively to the corresponding $\alpha,\beta$-bis-(p-hydroxyphenyl)-$\alpha,\beta$-disubstituted ethanes and p,p'-dihydroxy-$\alpha,\beta$-disubstituted stilbenes efficiently and economically.

The method of this invention is as follows:

A quantity of an alkali hydroxide, such as sodium hydroxide, potassium hydroxide, or lithium hydroxide, equal to at least two molecular equivalents of the composition to be treated is dissolved in a solvent selected from the class which consists of water-soluble glycols having less than 5 carbon atoms and water soluble polyalkylene glycols having less than ten carbon atoms. Examples of the glycols and polyalkylene glycols are: ethylene glycol, diethylene glycol, propylene glycol, dipropylene glycol, and triethylene glycol. The alkali hydroxide is dissolved in the glycol or polyalkylene glycol by heating and stirring, the temperature of the solution being gradually raised to at least 190° C. To the solution is added one molecular equivalent of a composition represented by either of the following formulas:

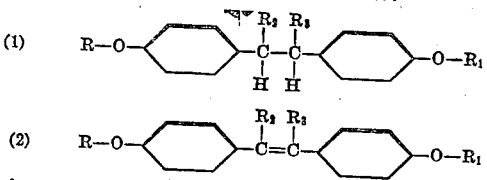

in which R is an alkyl radical having less than 5 carbon atoms, $R_1$ is an alkyl radical having less than 5 carbon atoms, $R_2$ is selected from the class which consists of alkyl and alkenyl radicals having less than 5 carbon atoms, and $R_3$ is selected from the class which consists of alkyl and alkenyl radicals having less than 5 carbon atoms. R and $R_1$ are preferably the same and are desirably the methyl or ethyl radical. The composition is heated with a solution of the alkali hydroxide in the glycol or polyalkylene glycol at a temperature of not less than 190° C. and preferably up to 235° C. for several hours. The completion of the reaction can be readily ascertained by taking an aliquot portion of the reaction mixture and diluting that aliquot portion with 10 volumes of water. A clear or almost clear solution indicates the completion of the reaction. During this time the alkali metal salt of the desired $\alpha,\beta$-bis-(p-hydroxyphenyl)-$\alpha,\beta$-disubstituted ethane or the p,p'-dihydroxy-$\alpha,\beta$-disubstituted stilbene is formed. These resulting alkali metal salts can be readily converted to the desired $\alpha,\beta$-bis-(p-hydroxyphenyl)-$\alpha,\beta$-disubstituted ethane or p,p'-dihydroxy-$\alpha,\beta$-disubstituted stilbenes by hydrolysis with a strong or weak acid, such as a mineral acid, for example, hydrochloric or sulfuric acid; an organic acid, for example, acetic acid; or carbon dioxide. Upon the addition of the acid the desired compound precipitates. The crude material may be recrystallized from a suitable solvent, such as alcohol or benzene.

Typical examples of the method of this invention are as follows:

Example 1.—Demethylation of p,p'-dimethoxy-$\alpha,\beta$-diethyl stilbene.

Fifty grams of potassium hydroxide is dissolved by heating and stirring in 150 cc. of diethylene glycol contained in a flask equipped with an air condenser and a stirrer. The temperature of the resulting solution is gradually raised to 190° C. and 50 g. of trans-p,p'-dimethoxy-$\alpha,\beta$-diethyl stilbene is added. The temperature is maintained substantially at 190° C. and preferably raised to between 215° C. and 235° C. The mixture is stirred vigorously for three hours or until the reaction is completed as indicated by dilution of an aliquot with ten volumes of water. A clear or almost clear solution indicates the completion of the reaction. During this time the potassium salt of the desired p,p'-dihydroxy-$\alpha,\beta$-diethyl stilbene is formed. The whole reaction solution is then diluted with ten volumes of water. Any insoluble material is removed by filtration. The resulting solution is rendered slightly or strongly acid with a mineral acid, such as hydrochloric or sulfuric acid, an organic acid, such as acetic acid, or carbon dioxide, whereupon the crude p,p'-dihydroxy-$\alpha,\beta$-diethyl stilbene precipitates. This crude material may be recrystallized from alcohol, benzene, or other suitable solvent and yields a white crystalline product melting in the range 167°–169.5° C. The product so obtained has the maximum physiological activity of trans p,p'-dihydroxy-$\alpha,\beta$-diethyl stilbene.

*Example 2.*—The demethylation of p,p'-dimethoxy-α,β-diethyl stilbene.

Instead of employing diethylene glycol as in Example 1, 150 cc. of dipropylene glycol is employed. The procedure outlined in Example 1 is followed exactly except for the substitution of the dipropylene glycol for the diethylene glycol.

*Example 3.*—Demethylation of α,β-bis-(p-methoxyphenyl)-α,β-diethyl ethane.

The procedure described in Example 1 is followed except that instead of using 150 cc. of diethylene glycol, 250 cc. of ethylene glycol is used and 50 g. of α,β-bis-(p-methoxyphenyl)-α,β-diethyl ethane (M. P. 140°–141° C.) is used instead of 50 g. of p,p'-dimethoxy-α,β-diethyl stilbene. The resulting product, α,β-bis-(p-hydroxyphenyl)-α,β-diethyl ethane, melts at 185°–186° C.

*Example 4.*—Demethylation of p,p'-dimethoxy-α-methyl-β-ethyl stilbene.

The procedure described in Example 1 is followed except that instead of employing 50 g. of p,p'-dimethoxy-α,β-diethyl stilbene, 50 g. of p,p'-dimethoxy-α-methyl-β-ethyl stilbene is used. The resulting product, p,p'-dihydroxy-α-methyl-β-ethyl stilbene, melts at 175°–176° C. (uncorrected).

*Example 5.*—Demethylation of p,p'-dimethoxy-α,β-di-n-butyl stilbene.

The procedure described in Example 1 is followed except that 50 g. of p,p'-dimethoxy-α,β-di-n-butyl stilbene is used instead of 50 g. of p,p'-dimethoxy-α,β-diethyl stilbene. The resulting p,p'-dihydroxy-α,β-di-n-butyl stilbene is an uncrystallizable oil.

*Example 6.*—Demethylation of p,p'-dimethoxy-α,β-diallyl stilbene.

The procedure described in Example 1 is followed except that 50 g. of p,p'-dimethoxy-α,β-diallyl stilbene is used instead of 50 g. of p,p'-dimethoxy-α,β-diethyl stilbene. The resulting p,p'-dihydroxy-α,β-diallyl stilbene is a noncrystalline solid.

What is claimed is:

1. The method of dealkylating a composition selected from the class which consists of α,β-bis-(p-alkoxy-phenyl)-α,β-dialkylethanes and p,p'-dialkoxy-α,β-dialkyl stilbenes, the alkoxy groups and the alkyl groups of said ethanes and said stilbenes having less than 5 carbon atoms; said method comprising reacting at a temperature above 190° C. said composition with a solution of an alkali hydroxide dissolved in a solvent selected from the class which consists of water-soluble glycols having less than 5 carbon atoms and water-soluble polyalkylene glycols having less than 10 carbon atoms.

2. The method of dealkylating a composition selected from the class which consists of α,β-bis-(p-alkoxy-phenyl)-α,β-dialkylethanes and p,p'-dialkoxy-α,β-dialkyl stilbenes, the alkoxy groups and alkyl groups of said ethanes and said stilbenes having less than 5 carbon atoms; said method comprising reacting at a temperature above 190° C. said composition with a solution of an alkali hydroxide dissolved in a solvent selected from the class which consists of water-soluble glycols having less than 5 carbon atoms and water-soluble polyalkylene glycols having less than 10 carbon atoms and hydrolyzing the resulting salt.

3. The method of dealkylating a composition in accordance with claim 1, in which the alkali hydroxide is potassium hydroxide.

4. The method of dealkylating a composition in accordance with claim 1, in which the solvent is diethylene glycol.

5. The method of dealkylating a p,p'-dialkoxy-α,β-diethyl stilbene which comprises reacting at a temperature above 190° C. said stilbene with a solution of an alkali hydroxide dissolved in a solvent selected from the class which consists of water-soluble glycols having less than 5 carbon atoms and water-soluble polyalkylene glycols having less than 10 carbon atoms.

6. The method of demethylating p,p'-dimethoxy-α,β-diethyl stilbene which comprises reacting at a temperature above 190° C. said stilbene with potassium hydroxide dissolved in diethylene glycol.

JOSEPH CORSE.